Dec. 22, 1964 R. B. PITTMAN 3,162,500

MULTIPLE-CIRCUIT PIN FOR MULTILAYER CIRCUITRY

Filed April 16, 1962 2 Sheets-Sheet 1

INVENTOR
ROBERT B. PITTMAN
BY James and Franklin
ATTORNEYS

Dec. 22, 1964 R. B. PITTMAN 3,162,500
MULTIPLE-CIRCUIT PIN FOR MULTILAYER CIRCUITRY
Filed April 16, 1962
2 Sheets-Sheet 2
FIG. 7
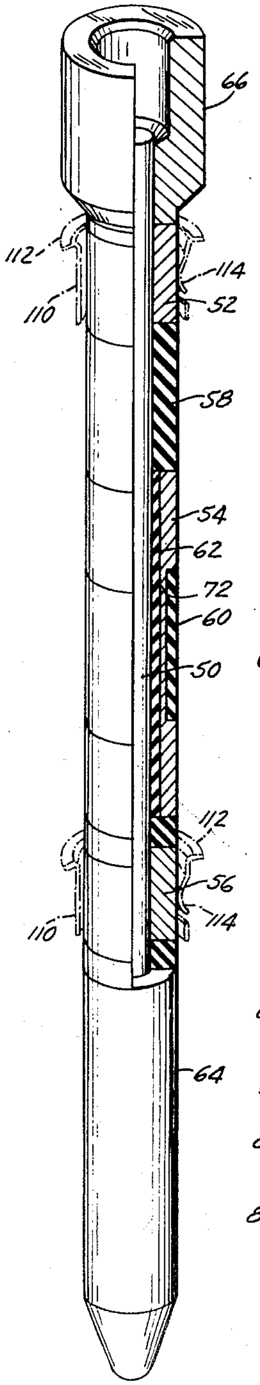
FIG. 5
PRIOR ART
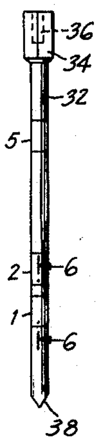
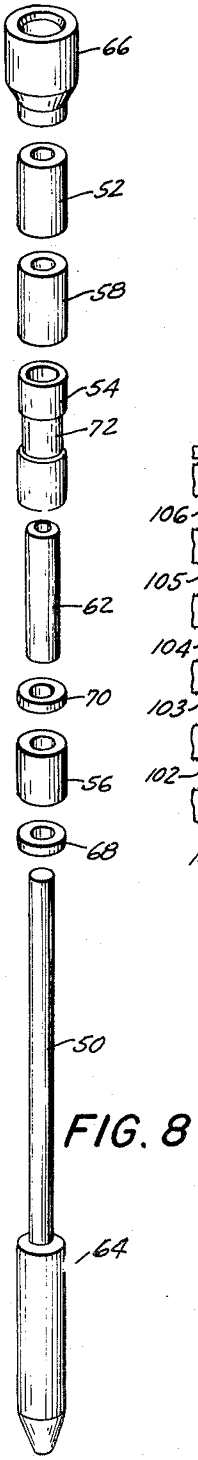
FIG. 10
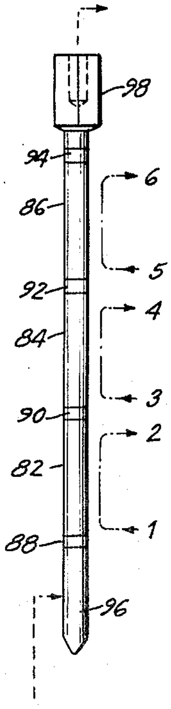
FIG. 6
PRIOR ART
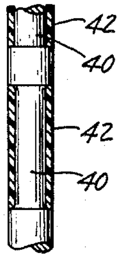
FIG. 9
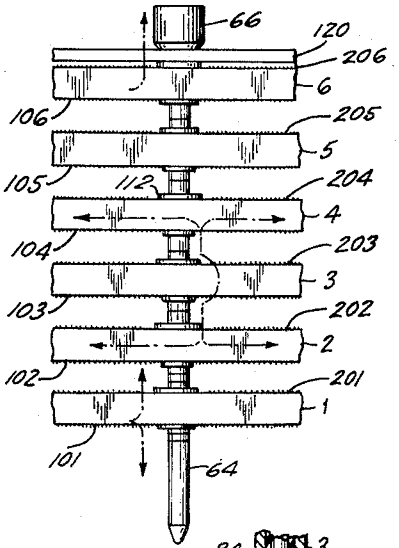
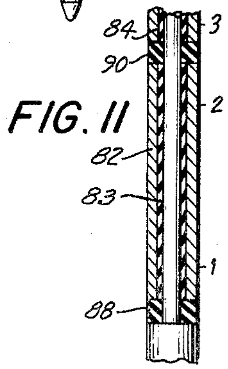
INVENTOR.
ROBERT B. PITTMAN
BY James and Franklin
ATTORNEYS

United States Patent Office 3,162,500
Patented Dec. 22, 1964

3,162,500

MULTIPLE-CIRCUIT PIN FOR MULTILAYER CIRCUITRY

Robert B. Pittman, River Edge, N.J., assignor to Industrial Electronic Hardware Corp., New York, N.Y., a corporation of New York Filed Apr. 16, 1962, Ser. No. 187,692
5 Claims. (Cl. 339—18)

This invention relates to multilayer circuitry of the type disclosed in a copending application of the present inventor and others, Serial No. 168,791, filed January 25, 1962, and entitled "Multilayer Circuitry."

That specification explains how complex wiring, typically for the back of a rack filled with interchangeable printed circuit boards forming part of a computer, may be replaced by a matrix system using perforated printed boards with printed matrix lines, and connector pins inserted through the perforations. The pins are metal, with bands of insulation at any matrix board to which there is to be no connection. Each pin acts as a single conductor.

The general object of the present invention is to improve the said matrix system and its versatility in use, by the provision of an additional type of pin which acts as a multiple rather than a single circuit between different matrix boards.

To accomplish the foregoing general objects and other more specific objects which will hereinafter appear, my invention resides in the multiple circuit pin elements, and their relation one to another and to the printed matrix boards, as are hereinafter more particularly described in the following specification. The specification is accompanied by drawings in which:

FIG. 5 shows one of a large number of single circuit pins having different numbers and locations of insulation bands as known in the prior art;

FIG. 6 is a fragmentary section taken approximately in the plane of the line 6—6 of FIG. 5;

FIG. 7 is a partially sectioned perspective view showing one example of my improved multiple circuit pin;

FIG. 8 is a perspective view showing the parts of the pin of FIG. 7 in disassembled relation;

FIG. 9 is a fragmentary elevation showing the relation of the pin of FIG. 7 to the superposed printed matrix boards;

FIG. 10 is an elevation of another pin made in accordance with the present invention; and FIG. 11 is a fragmentary section through the pin of FIG. 10.

Figure 1:
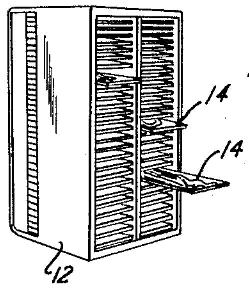
FIG. 1 is a perspective view of a computer rack to which the present invention may be applied.
Figure 2:
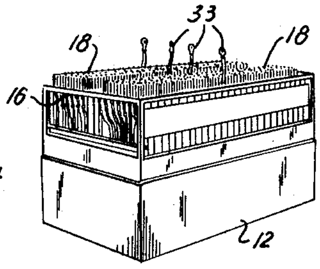
FIG. 2 is another view of the rack turned face downward to expose the numerous terminals at the back which are to be connected by back panel wiring.

Referring to the drawing, and more particularly to FIGS. 1 and 2, the rack generally designated 12 forms part of a computer. It has guide grooves for the slidable reception of printed circuit boards 14, sometimes called "mother boards." The inner or rear edges of the boards are received in edge board connectors located at 16 in FIGS. 2 and 3. These provide detachable connection to the printed lines on the boards 14. The edge board connectors themselves have a terminal for each contact, resulting in an array of a large number of terminals. In the particular case shown, there are 880 terminals, indicated generally at 18. In the prior practice these terminals have been interconnected by hundreds of insulated wire leads or back panel wiring.

Figure 3:
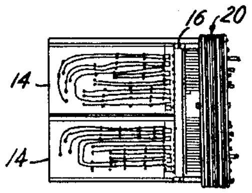
FIG. 3 is a view somewhat like a transverse section, showing two mother boards received in edge board connectors to which multilayer circuitry has been applied.
Figure 4:
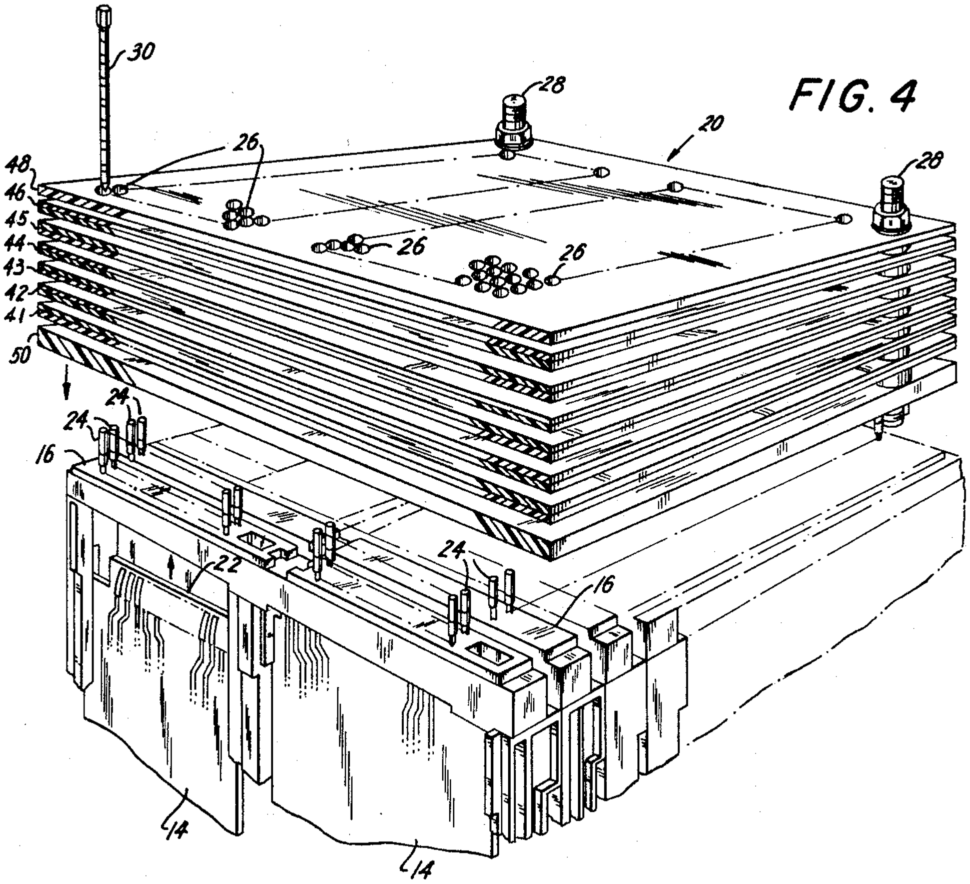
FIG. 4 is a perspective fragmentary view showing the matrix boards separated from the back of the rack, with one of the pins about to be inserted through the boards.

In accordance with the aforesaid copending application Serial No. 168,791, this back panel wiring is replaced by a multilayer matrix indicated generally at 20 in FIGS. 3 and 4, the said matrix being omitted in FIGS. 1 and 2. The matrix boards are co-extensive in area with the array of edge board connectors 16 and the terminals 18 thereof, and they are disposed in perpendicular relation to the mother boards 14.

Referring now to FIG. 4, the matrix boards generally designated 20 are shown disposed over but separated from the back of the rack, the latter having been turned face down as in FIG. 2, so that the mother boards 14 are upright, with their then upper edges slidably received in the edge board connectors 16. In FIG. 4 one mother board has been slid down somewhat to show its edge 22. The connectors 16 may be conventional, except that female rather than male terminals are wanted at the top. In the specific case here shown male terminals have been converted to female terminals by the addition of closed-entry contacts 24. Only a few of the terminals are shown, but it will be understood that the connectors are filled with terminals.

The matrix boards 20 have a large number of holes, a few of which are indicated at 26, and in the present case about half of these are located in alignment with the terminals 24. All of the holes in each board are in alignment with the corresponding holes in all of the other boards, and the boards are held in registration, as by means of spacers and bolts, two of which are indicated at 28. There are also grounding bolts which pass through the matrix boards and into the rear frame of the rack, and these act as ground connections for shielding.

The circuitry is completed by pins, one of which is indicated at 30, and which are dimensioned to pass through the aligned holes, and which in many cases, though not necessarily in all, are received in the female terminals 24 to provide electrical connection from the terminals to the printed lines on the matrix boards. Additional rows of holes may be located between the rows of terminals 24 to make possible additional connections between matrix boards.

In the present case there are six matrix boards marked 41–46. There is also a thicker base plate 50, and a thinner insulation cover board 48, which have no printed circuitry. The matrix boards 41–46 are printed with different lines or grids, and in the particular case here shown, the board 41 has vertical lines; the board 42 has horizontal lines; the board 43 has diagonal lines; the board 44 has diagonal lines of opposite slope; the board 45 has interrupted vertical lines or dashes; and the board 46 has interrupted transverse lines or dashes. The opposite face of each matrix board, in this case the upper face, is coated with a metallic shield surface or coating, and even the grid side of the board has another grid of grounded shield lines alternating between the circuit lines. The boards marked 41–46 may for convenience be referred to more generally as boards 1, 2, 3, 4, 5, and 6. These boards are not illustrated in detail, being shown in the co-pending application Serial No. 168,791 previously referred to.

Referring to FIG. 5 the pin 32 there shown is made of metal, and preferably includes a head 34 which acts as a stop, and which may be counterbored at 36 for the addition of another conductor in the remote possibility that additional connection is needed. The lower end is preferably bluntly pointed at 38 to facilitate its reception in the female terminals (24 in FIG. 4).

The pin shown in FIG. 5 has bands or sleeves of insulation marked 1, 2 and 5 which would prevent contact with matrix boards number 1, 2 and 5. However, electrical contact would be made with the remaining matrix boards number 3, 4 and 6, and thus the tip 38 and boards 3, 4 and 6 would all be connected to each other by the pin 32, acting as a single circuit connection.

Referring now to FIG. 6, the metal pin is cut away or necked somewhat at 40 to receive bands or sleeves of insulation 42. Such single circuit pins are disclosed in the copending application Serial No. 168,791 previously referred to. A considerable variety of such pins is provided, with different numbers and locations of insulation bands. In addition, pins may be provided which are shorter by omission of the lower end, thus making possible connection between boards without a connection to a female terminal at the lower end of the pin.

Referring now to FIGS. 7 and 8, my improved pin there shown is more complex and is adapted to provide multiple circuits while using a single pin. Specifically, the illustrated pin comprises a metal core 50 and metal sleeves 52, 54, and 56. These sleeves are used where contact is to be made with a matrix board. The pin further comprises insulation sleeves 58 and 60 which are used where no contact is to be made. There is also a smaller diameter insulation sleeve 62 which fits between the core 50 and the metal sleeve 54. The outside diameter of the metal sleeves 52 and 54 is the same, but the inside diameter of the sleeve 52 is small enough to engage the core 50, whereas the inside diameter of the sleeve 54 is large enough to provide room for the internal insulation sleeve 62. In this way each pin may provide multiple circuits which are insulated from one another.

Thus, referring to FIG. 9, with the present pin the matrix board 2 is connected to matrix board 4 without a connection to the intervening matrix board 3. This is suggested by the arrows at boards 2 and 4 and the arcuate "jumper" representing sleeve portion 72 (FIG. 7) at board 3 (FIG 9). At the same time there is a separate and independent electrical connection between the tip 64 and matrix boards 1 and 6, as well as to the head 66.

It will be understood that the pointed tip 64 shown at the bottom of FIG. 9 below the boards enters the aligned one of the female contacts 24 shown in FIG. 4 below the boards. In FIG. 4 the lower end of pin 30, when pushed all the way down, would enter the leftmost female contact 24.

FIG. 8 shows the parts of the pin disassembled. It will be seen that the pin is made of a core or shank 50 which may be integral with the tip 64 (or it could be received in a hole in tip 64). The core 50 receives an insulation ring 68, a metal sleeve 56, and another insulation ring 70. In the particular pin here shown the ring 68 is superfluous electrically, but the ring 70 is used and is needed for insulation purposes. However, the ring 68 is employed as a spacer, so that the metal sleeves may be of uniform length.

The insulation ring 70 is followed by an internal insulation sleeve 62 around which the external metal sleeve 54 is received. In the present case where the connection is to skip one intermediate matrix board, the sleeve 54 is stepped at 72, and this step itself receives an insulation band, shown at 60 in FIG. 7, but omitted in FIG. 8.

The external metal sleeve 54 is followed by an insulation sleeve 58, metal sleeve 52, and the head 66. When these parts are assembled together, as shown in FIG. 7, the annular bands of metal and insulation are properly spaced to match the spacing of the matrix boards.

It will be understood that metal sleeves 56 and 52, and also the head 66, are electrically and mechanically secured to the core 50, as by soldering or welding. The head 66 is preferably hollow or counterbored as shown at the top of FIG. 7 for possible addition of another conductor. The insulation sleeve 60 which is placed over part of the metal sleeve 54 may be applied by molding the insulation in position or by using a sleeve of "shrink-on" plastic which is dipped in a dilating liquid and then applied and permitted to shrink. Another method is to apply a loose sleeve of a heat-shrinkable plastic which is subjected to heat to shrink it into the necked portion of the sleeve.

It should be understood that the electrical connections provided for in the pin shown in FIGS. 7, 8 and 9 is merely one example of a variety of such pins which may be made to suit different needs. Thus, referring to FIG. 10, the core of the pin there illustrated receives insulation and metal sleeves which serve to connect board 1 to board 2; board 3 to board 4, and board 5 to board 6. In this case the metal sleeves 82, 84 and 86 are long enough to connect two adjacent boards, and they are separated by insulation rings 88, 90, 92, and 94. The tip 96 is connected to the head 98 by means of the metal core. FIG. 11 shows the parts 82, 88 and 90 to larger scale, and also the internal insulation sleeve 83. In this extreme case a single pin is made to provide four different circuits, all insulated from one another. There are three connections between adjacent pairs of boards, and a fourth connection between the tip 96 and the head 98.

It will be understood that in a different form the pin could be used to connect matrix boards 1 and 2 alone, or matrix boards 3 and 4 alone, or matrix boards 5 and 6 alone, by the use of one insulated metal sleeve like sleeve 82, or any two pairs by two sleeves, say boards 1 and 2 by one sleeve, and boards 3 and 4 by another sleeve. Also the pair of boards which are connected may be boards 2 and 3, or boards 4 and 5, each by one sleeve, or both such pairs by the use of two such sleeves.

Similarly, when using a stepped sleeve such as the sleeve 54 in FIG. 7, the boards which are connected could be 1 and 3, or 3 and 5, or 4 and 6, instead of the boards 2 and 4 as shown. Also two such stepped sleeves could be used for simultaneous independent connection of board 1 with board 3, and board 4 with board 6.

In addition, combinations of the short unstepped sleeve 82 and the stepped sleeve 54 may be used, as for example, to connect boards 1 and 3 by means of a stepped sleeve, and boards 4 and 5 or boards 5 and 6 by means of an unstepped sleeve. Also, the stepped sleeve might connect boards 4 and 6, and an unstepped sleeve may simultaneously independently connect boards 1 and 2, or boards 2 and 3.

Moreover, unstepped sleeves longer than two units may be provided for connecting more than two adjacent boards, and a stepped sleeve may be provided in which the step is twice as long axially, so as to connect, say boards 1 and 4, or 2 and 5, or 3 and 6.

In all cases additional connections may be made from the tip through the metal core 50, and one or more soldered or welded sleeves such as the sleeve 52 or 56 in FIG. 7, to any desired one or more boards.

Referring to FIG. 9, the matrix lines are printed on the bottom face of each board, and are here indicated by stippling at 101, 102, 103, 104, 105, and 106. As previously pointed out, the matrix lines at 101 extend in one direction, say vertically; the matrix lines at 102 extend in transverse direction, say horizontally; the matrix lines 103 are diagonal in one direction; the matrix lines 104 are also diagonal but with opposite slope; the matrix lines 105 may be interrupted vertical lines or dashes, and the matrix lines 106 may be interrupted lines or dashes which are transverse to the dashes 105. Examples of such printed boards are fully described in co-pending application Serial No. 168,791 previously mentioned.

The perforations through the boards are lined with metal bushings which are connected to the printed lines, and which preferably receive the pins with resilient fit in order to establish good electrical contact. In FIG. 7 about half of only two of the six aligned bushings is shown. The bushing comprises a cylindrical part 110 with a flange 112 at the top. The cylindrical part has a plurality, say three tongues 114 struck inward to bear snugly against the inserted pin. After the numerous holes in the boards are filled with bushings the lower ends of the bushings are soldered to the matrix lines, and for this purpose each bushing projects somewhat below the insulation board, as shown in FIG. 9. The soldered connection is at the lower end of the bushing and at the bottom of the board.

The top surface of each board preferably is coated with a continuous sheet of metal to act as a shield between adjacent boards. This coating is indicated in FIG. 9 by stippling at 201, 202, 203, 204, 205 and 206. The coatings are interrupted at each bushing, there being an uncoated insulation circle somewhat larger in diameter than the diameter of the flange 112 (FIG. 7), so that the shield surface is not connected to the bushings and the matrix lines. Instead, at other and idle portions of the boards, one or more special grounding bolts are applied which connect the shield areas to the grounded chassis of the rack.

In practice it is found easier to print metal on one side only of an insulation board, and for that reason the boards here shown are actually laminated boards. Each board is ⅛" in thickness, and is made up of two laminations, each $\frac{1}{16}$" in thickness. The lower lamination is printed with matrix lines on its bottom face, and the upper lamination is printed with shielding metal on its upper face. The laminations may be secured together in any desired fashion, and in any case are held together by the bushings.

As shown in FIG. 9, an additional lamination 120 may be applied on top of the laminated printed board #6, this acting simply as a protective cover. In the particular system shown the printed boards are mounted above and are supported by a base board 50 (FIG. 4) which is of adequate thickness, say ¼" thick. This board may not be needed in some cases.

The particular circuit connections illustrated in FIG. 9 and FIG. 10 are given merely by way of example, and are not intended to be in limitation of the invention. When dealing with the single circuit pins shown in FIGS. 5 and 6 it was already the practice to provide many different pins to meet different conditions. Similarly the multiple circuit pin may be assembled of appropriate parts, used in different combinations, to make possible a variety of circuit connections. The two illustrated examples therefore are merely two of a large number of forms taken by this multiple circuit pin when in use.

It is believed that the construction and method of assembly, as well as the method of use and the advantages of my improved multiple circuit pin, will be apparent from the foregoing detailed description. It will also be apparent that while I have shown and described the invention in several forms, many changes may be made without departing from the scope of the invention as sought to be defined in the following claims. In the claims the term "superposed" is used for convenience, but the matrix boards may be and usually are vertical or edgewise as shown in FIG. 3.

I claim:

1. A pin for use in multilayer circuitry comprising a plurality of superposed perforated matrix boards having printed wiring, said pin having a point at one end and a small metal head at the other end with a shank of uniform outside diameter therebetween, said shank having a slender metal core, metal sleeves where contact is to be made, and an insulation sleeve between said core and one or more of said metal sleeves, the latter sleeves having the same external diameter but a larger internal diameter than other metal sleeves which directly engage the core, whereby each pin may provide multiple circuits which are insulated from one another, and one of said metal sleeves of larger internal diameter having a portion intermediate its ends reduced in diameter and having an insulation band received in said reduced diameter portion, whereby said last-named metal sleeve may be used to connect two boards without contacting an intermediate board.

2. A pin for use in multilayer circuitry comprising a plurality of superposed perforated matrix boards having printed wiring, said pin having a point at one end and a small metal head at the other end with a shank of uniform outside diameter therebetween, said shank having a slender metal core, metal sleeves where contact is to be made, insulation sleeves where no contact is to be made, and an insulation sleeve between said core and one or more of said metal sleeves, the latter sleeves having the same external diameter but a larger internal diameter than other metal sleeves which directly engage the core, whereby each pin may provide multiple circuits which are insulated from one another, and one of said metal sleeves of larger internal diameter having a portion intermediate its ends reduced in diameter and having an insulation band received in said reduced diameter portion, whereby said last-named metal sleeve may be used to connect two boards without contacting an intermediate board.

3. Multilayer circuitry comprising a plurality of superposed matrix boards having printed wiring, means holding said boards in superposed relation, said boards having aligned holes for connections therebetween, a metal eyelet contact bushing secured in each hole, said bushing having spring tongues projecting inwardly and being connected to a printed circuit line on one face of the board, and metal pins in said aligned holes for connections between said boards, said pins having a point at one end and a small metal head at the other end with a shank of uniform outside diameter therebetween, some of said pins having a slender metal core, metal sleeves where contact is to be made, and an insulation sleeve between said core and one or more of said metal sleeves, the latter sleeves having the same external diameter but a larger internal diameter than other metal sleeves which directly engage the core, whereby each pin may provide multiple circuits which are insulated from one another, and one of said metal sleeves of larger internal diameter having a portion intermediate its ends reduced in diameter and having an insulation band received in said reduced diameter portion, whereby said last-named metal sleeve may be used to connect two boards without contacting an intermediate board.

4. Multilayer circuitry comprising a plurality of superposed matrix boards having printed wiring, means holding said boards in superposed relation, said boards having aligned holes for connections therebetween, a metal eyelet contact bushing secured in each hole, said bushing having spring tongues projecting inwardly and being connected to a printed circuit line on one face of the board, and metal pins in said aligned holes for connections between said boards, said pin having a point at one end and a small metal head at the other end with a shank of uniform outside diameter therebetween, some of said pins having a slender metal core, metal sleeves where contact is to be made, insulation sleeves where no contact is to be made, and an insulation sleeve between said core and one or more of said metal sleeves, the latter sleeves having the same external diameter but a larger internal diameter than other metal sleeves which directly engage the core, whereby each pin may provide multiple circuits which are insulated from one another, and one of said metal sleeves of larger internal diameter having a portion intermediate its ends reduced in diameter and having an insulation band received in said reduced diameter portion, whereby said last-named metal sleeve may be used to connect two boards without contacting an intermediate board.

5. Multilayer circuitry comprising a plurality of superposed shielded matrix boards, said boards having printed wiring on one face and a conductive shielding surface on the opposite face, means holding said boards in superposed relation with spacers therebetween, said boards having aligned holes for connections therebetween, a metal eyelet contact bushing secured in each hole, said bushing having spring tongues projecting inwardly and being connected to a printed circuit line on one face of the board but insulated from the conductive shielding on the opposite face of the board, and metal pins in said aligned holes for connections between said boards, said pin having a point at one end and a small metal head at the other end with a shank of uniform outside diameter therebetween, some of said pins having a slender metal core, metal sleeves where contact is to be made, insulation sleeves where no contact is to be made, and an insulation sleeve between said core and one or more of said metal sleeves, the latter sleeves having the same external diameter but a larger internal diameter than other metal sleeves which directly engage the core, whereby each pin may provide multiple circuits which are insulated from one another, and one of said metal sleeves of larger internal diameter having a portion intermediate its ends reduced in diameter and having an insulation band received in said reduced diameter portion, whereby said last-named metal sleeve may be used to connect two boards without contacting an intermediate board.

References Cited by the Examiner

UNITED STATES PATENTS

| | | | |
|---|---|---|---|
| 840,537 | 1/07 | Weir | 339—18 |
| 1,022,912 | 4/12 | Winston | 339—150 |
| 2,586,854 | 2/52 | Myers | 339—17 |
| 2,914,706 | 11/59 | Hill et al. | 317—101 |
| 2,967,285 | 1/61 | Freitas | 339—18 |
| 3,008,113 | 11/61 | Johnson | 339—17 |
| 3,049,645 | 8/62 | Skirpan | 339—18 X |
| 3,052,749 | 9/62 | Snapp et al. | 339—18 |
| 3,096,393 | 7/63 | Mancini | 339—275 X |

JOSEPH D. SEERS, *Primary Examiner.*